(12) United States Patent
Xie et al.

(10) Patent No.: US 12,119,457 B2
(45) Date of Patent: Oct. 15, 2024

(54) SECONDARY BATTERY, BATTERY MODULE, BATTERY PACK AND POWER CONSUMING DEVICE

(71) Applicant: CONTEMPORARY AMPEREX TECHNOLOGY CO., LIMITED, Ningde (CN)

(72) Inventors: Haotian Xie, Ningde (CN); Xin Sun, Ningde (CN); Yongshou Lin, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/525,335

(22) Filed: Nov. 30, 2023

(65) Prior Publication Data

US 2024/0145793 A1    May 2, 2024

Related U.S. Application Data

(63) Continuation of application No. PCT/CN2022/072752, filed on Jan. 19, 2022.

(51) Int. Cl.
  *H01M 10/42*   (2006.01)
  *H01M 4/13*   (2010.01)
  (Continued)

(52) U.S. Cl.
  CPC ....... *H01M 10/4235* (2013.01); *H01M 4/131* (2013.01); *H01M 4/5825* (2013.01);
  (Continued)

(58) Field of Classification Search
  None
  See application file for complete search history.

(56) References Cited

FOREIGN PATENT DOCUMENTS

| CN | 106299507 A | 1/2017 | |
|---|---|---|---|
| CN | 110729451 | * 1/2020 | ........ H01M 10/0525 |

(Continued)

OTHER PUBLICATIONS

The World Intellectual Property Organization (WIPO) Written Opinion for PCT/CN2022/072752 Oct. 10, 2022 8 pages (with translation).

(Continued)

*Primary Examiner* — Barbara L Gilliam
*Assistant Examiner* — Angela J Martin
(74) *Attorney, Agent, or Firm* — ANOVA LAW GROUP, PLLC

(57) ABSTRACT

A secondary battery includes a positive electrode plate and an electrolyte solution. The positive electrode plate includes a positive current collector and a positive electrode film provided on at least one surface of the positive current collector. The positive electrode film includes a positive electrode active material and a lithium supplement. The lithium supplement includes at least one of substances represented by formula (I) below, and the positive electrode film and/or electrolyte solution comprises one or more nitrone derivatives, a molecule of each of which includes a structure represented by formula (II) below:

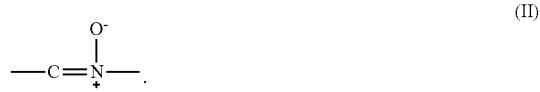

17 Claims, 2 Drawing Sheets

(51) Int. Cl.
  *H01M 4/131* (2010.01)
  *H01M 4/58* (2010.01)
  *H01M 10/05* (2010.01)
  *H01M 10/0525* (2010.01)
  *H01M 4/02* (2006.01)

(52) U.S. Cl.
  CPC .................. *H01M 10/0525* (2013.01); *H01M 2004/021* (2013.01); *H01M 2004/028* (2013.01)

(56) References Cited

FOREIGN PATENT DOCUMENTS

| | | | | |
|---|---|---|---|---|
| CN | 110729451 A | 1/2020 | | |
| CN | 111725575 A | 9/2020 | | |
| CN | 112490490 A | 3/2021 | | |
| CN | 113193173 A | 7/2021 | | |
| JP | 2001332296 | * 11/2001 | ............ | H01M 10/05 |
| JP | 2001332296 A | 11/2001 | | |
| JP | 2004227945 A | 8/2004 | | |
| KR | 20200042319 | * 4/2020 | .......... | H01M 10/052 |

OTHER PUBLICATIONS

The World Intellectual Property Organization (WIPO) International Search Report for No. PCT/CN2022/072752 Oct. 10, 2022 6 Pages (including translation).

* cited by examiner

SECONDARY BATTERY, BATTERY MODULE, BATTERY PACK AND POWER CONSUMING DEVICE

CROSS-REFERENCE TO RELATED APPLICATION

This application is a continuation of International Application No. PCT/CN2022/072752, filed on Jan. 19, 2022, the entire content of which is incorporated herein by reference.

TECHNICAL FIELD

The present application relates to the technical field of secondary batteries, and in particular to a secondary battery, a battery module, a battery pack and a power consuming device.

Background Art

In recent years, with the increasing application range, secondary batteries are widely used in energy storage power systems such as hydraulic power, thermal power, wind power and solar power stations, as well as many fields such as electric bicycles, electric motorcycles, electric vehicles, military equipment, and aerospace. Due to the great development of secondary batteries, higher requirements have also been placed on the secondary batteries in terms of energy density, cycle performance, safety performance, etc.

A secondary battery is generally composed of a positive electrode, a negative electrode, and an electrolyte solution, etc. For example, in an lithium-ion secondary battery, charge transfer is usually achieved by means of the deintercalation of lithium ions in positive and negative electrodes, followed by the transfer of lithium ions by the electrolyte in an electrolyte solution, such that chemical energy and electric energy can be mutually converted. However, during the first charging process, a solid electrolyte film layer (SEI) will be formed on the surface of the negative electrode, which consumes a large amount of positive electrode lithium source and causes the loss of recyclable lithium. Therefore, in the related art, in order to make up for the consumption of the lithium source, lithium is generally pre-supplemented by adding a lithium supplement to a secondary battery. However, during the charging/discharging process, different lithium supplements will undergo various metal valence changes or side reactions with electrolyte solutions etc., which may reduce its actual utilization efficiency. Therefore, the existing positive electrode lithium pre-supplementing technologies still need to be improved.

SUMMARY

The present application is made in view of the above-mentioned technical problems, and an object of the present application is to provide a secondary battery, in which the utilization efficiency of a lithium supplement can be improved when a specific lithium supplement is used, thereby improving the charge/discharge capacity and service life of the secondary battery.

In order to achieve the above-mentioned object, by including a specific additive in an electrolyte solution or a positive electrode plate, the present disclosure can improve the utilization efficiency of the specific lithium supplement and improve the charge/discharge capacity and service life of the secondary battery.

A first aspect of the present application provides a secondary battery, which includes a positive electrode plate and an electrolyte solution. The positive electrode plate comprises a positive current collector and a positive electrode film provided on at least one surface of the positive current collector, wherein the positive electrode film comprises a positive electrode active material and a lithium supplement, and the lithium supplement is at least one selected from the substances represented by general formula (I) below,

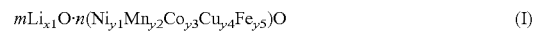

$$mLi_{x1}O \cdot n(Ni_{y1}Mn_{y2}Co_{y3}Cu_{y4}Fe_{y5})O \quad (I)$$

in general formula (I), $1 \le x1 \le 2$; $0 \le y1 \le 1$; $0 \le y2 \le 1$; $0 \le y3 \le 1$; $0 \le y4 \le 2$; $0 \le y5 \le 1$; $0.5 \le y1+y2+y3+y4+y5 \le 1$; $1 \le m \le 3$; $0 \le n/m \le 1$, the positive electrode film and/or the electrolyte solution includes any one or two or more selected from nitrone derivatives having a structure represented by the formula (II) below in the molecule as an additive (A),

Therefore, a secondary battery can be provided, which improves the utilization efficiency of the above-mentioned lithium supplement with the above-mentioned additive (A), thereby improving the charge/discharge capacity and service life.

In any embodiment, the molar content N1 of the above-mentioned lithium supplement and the molar content N2 of the above-mentioned additive (A) satisfy the following relational expression: $0.1 \le N2/(N1 \times m \times x1) \le 0.5$; optionally, N1 and N2 satisfy the following relational expression: $0.25 \le N2/(N1 \times m \times x1) \le 0.31$. Therefore, the harmful side reaction caused by the migration of lithium ions of the lithium supplement can be effectively reduced, and the utilization efficiency of the lithium supplement can be further improved.

In any embodiment, the above-mentioned lithium supplement is at least one selected from $Li_2O$, $Li_2O_2$, $Li_5FeO_4$, and $Li_2Cu_{0.5}Ni_{0.5}O_2$; optionally, the lithium supplement is at least one selected from $Li_2O$ and $Li_2O_2$. Therefore, it can not only make up for the loss of recyclable lithium due to a large amount of lithium source consumed by the formation of a solid electrolyte film layer (SEI) on the surface of the negative electrode during the first charging process, but also further improve its utilization efficiency by adding the additive (A) to the positive electrode film or electrolyte solution, thereby further improving the charge/discharge capacity and the service life of the secondary battery.

In any embodiment, the nitrone derivatives are compounds represented by the general formula (II') below, and/or cyclic nitrone derivatives with 4-8 membered rings,

in formula (II'), $R_1$ and $R_2$ are each independently at least one selected from methyl, ethyl, propyl, isopropyl, butyl, isobutyl, tert-butyl, fluoromethyl, fluoroethyl, fluoropropyl, methylhydroxy, ethylhydroxy, phenyl, tolyl, fluorophenyl, methoxy, and ethoxy, 1,1-dimethyl-ethanol group, 1,1-dimethyl-propanol group, 1,1-dimethyl-butanol group, 1-methyl-propanol group and tert-butyl triol group.

In any embodiment, the additive (A) is at least one selected from N-tert-butyl-α-phenylnitrone, N-tert-butyl-α-4-fluorophenylnitrone, 5,5-dimethyl-1-pyrroline oxide, and N-tert-butyl-α-methylnitrone. Therefore, the utilization efficiency of the above-mentioned lithium supplement added into the secondary battery can be improved, thereby improving the charge/discharge capacity and service life of the secondary battery.

In any embodiment, the volume average particle size Dv50 of the above-mentioned lithium supplement is greater than the volume average particle size Dv50 of the positive electrode active material; optionally, the volume average particle size Dv50 of the above-mentioned lithium supplement is 5 μm-15 μm. Therefore, the delithiation efficiency of the lithium supplement can be further improved, and the effect of the additive (A) on improving the utilization efficiency of the lithium supplement can be improved.

In any embodiment, the specific surface area of the above-mentioned lithium supplement is 0.5 $m^2/g$-20 $m^2/g$, optionally 1 $m^2/g$-2 $m^2/g$. Therefore, the delithiation efficiency of the lithium supplement can be further improved, and the effect of the additive (A) on improving the utilization efficiency of the lithium supplement can be improved.

In any implementation, the purity of the lithium supplement is greater than or equal to 90%; optionally, greater than or equal to 95%. Therefore, the delithiation efficiency of the lithium supplement and the energy density of the battery can be further improved.

In any embodiment, the first delithiation capacity of the above-mentioned lithium supplement is 300-1500 mAh/g, optionally 400-900 mAh/g. Therefore, the supplementary effect of the lithium supplement on the lithium source consumption can be better exerted.

In any embodiment, the first charge/discharge voltage range of the above-mentioned lithium supplement is 2.0V-4.5V (vs Li), optionally 3.0V-4.2V (vs Li). Therefore, the lithium supplement can be further better matched with the corresponding potential of the positive electrode active material, thereby reducing side reactions caused by the oxidation of the electrolyte solution and improving the lithium utilization rate of the lithium supplement.

In any embodiment, the above-mentioned electrolyte solution further comprises dimethyl carbonate; optionally, the content of the dimethyl carbonate in the electrolyte solution is 20 mass %-80 mass %, optionally 60 mass %-70 mass %. Therefore, the electrical conductivity of the electrolyte solution can be improved to alleviate the tendency of deterioration of the direct current resistance (DCR) caused by the additive (A).

In any embodiment, the above-mentioned positive electrode active material comprises a lithium-containing phosphate. Therefore, the lithium supplement can make for the lithium source consumed by the first charging, thereby improving and stabilizing the cycle capacity of the secondary battery and increasing the service life of the secondary battery.

A second aspect of the present application further provides a battery module comprising the secondary battery of the first aspect.

A third aspect of the present application provides a battery pack comprising the battery module of the second aspect of the present application.

A fourth aspect of the present application provides a power consuming device comprising at least one selected from the secondary battery of the first aspect of the present application, the battery module of the second aspect of the present application, or the battery pack of the third aspect of the present application.

According to the present disclosure, a secondary battery, a battery module, a battery pack, and a power consuming device using the secondary battery are obtained, in which not only the lithium supplement is used to improve the charge/discharge capacity, but also the additive (A) is used to further improve the utilization efficiency of the lithium supplement, thereby further improving the charge/discharge capacity and cycle life of the secondary battery.

Figure 1:
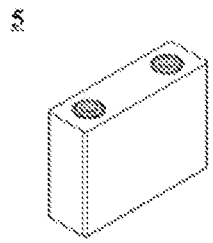
FIG. 1 is a schematic diagram of a secondary battery in an embodiment of the present application.

LIST OF REFERENCE SIGNS 1 battery pack; 2 upper box body; 3 lower box body; 4 battery module; 5 secondary battery; 51 housing; 52 electrode assembly; 53 top cover assembly.

DETAILED DESCRIPTION OF EMBODIMENTS

Hereafter, embodiments of a secondary battery, a battery module, a battery pack and a power consuming device of the present application are specifically disclosed in the detailed description with reference to the accompanying drawings as appropriate. However, unnecessary detailed illustrations may be omitted in some instances. For example, there are situations where detailed description of well known items and repeated description of actually identical structures are omitted. This is to prevent the following description from being unnecessarily verbose, and facilitates understanding by those skilled in the art. Moreover, the accompanying drawings and the descriptions below are provided for enabling those skilled in the art to fully understand the present application, rather than limiting the subject matter disclosed in claims.

"Ranges" disclosed in the present application are defined in the form of lower and upper limits, and a given range is defined by selection of a lower limit and an upper limit, the selected lower and upper limits defining the boundaries of the particular range. Ranges defined in this manner may be inclusive or exclusive, and may be arbitrarily combined, that is, any lower limit may be combined with any upper limit to form a range. For example, if the ranges of 60-120 and 80-110 are listed for a particular parameter, it should be understood that the ranges of 60-110 and 80-120 are also contemplated. Additionally, if minimum range values 1 and 2 are listed, and maximum range values 3, 4, and 5 are listed, the following ranges are all contemplated: 1-3, 1-4, 1-5, 2-3, 2-4 and 2-5. In the present application, unless stated otherwise, the numerical range "a-b" denotes an abbreviated representation of any combination of real numbers between a and b, where both a and b are real numbers. For example, the numerical range "0-5" means that all real numbers between "0-5" have been listed herein, and "0-5" is just an abbreviated representation of combinations of these numerical values. In addition, when a parameter is expressed as an integer of ≥2, it is equivalent to disclosing that the parameter is, for example, an integer of 2, 3, 4, 5, 6, 7, 8, 9, 10, 11, 12, and the like.

All the embodiments and optional embodiments of the present application can be combined with one another to form new technical solutions, unless otherwise stated.

All technical features and optional technical features of the present application can be combined with one another to form a new technical solution, unless otherwise stated.

Unless otherwise stated, all the steps of the present application can be performed sequentially or randomly, in some embodiments sequentially. For example, the method including steps (a) and (b) indicates that the method may include steps (a) and (b) performed sequentially, and may also include steps (b) and (a) performed sequentially. For example, reference to "the method may further include step (c)" indicates that step (c) may be added to the method in any order, e.g., the method may include steps (a), (b) and (c), or steps (a), (c) and (b), or steps (c), (a) and (b), etc.

The terms "comprise" and "include" mentioned in the present application are open-ended, unless otherwise stated. For example, the terms "comprising" and "including" may mean that other components not listed may or may not also be comprised or included.

In the present application, the term "or" is inclusive unless otherwise specified. For example, the phrase "A or B" means "A, B, or both A and B." More specifically, a condition "A or B" is satisfied by any one of the following: A is true (or present) and B is false (or not present); A is false (or not present) and B is true (or present); or both A and B are true (or present). In this disclosure, the phrases "at least one of A, B, and C" and "at least one of A, B, or C" both mean only A, only B, only C, or any combination of A, B, and C.

In the study of the effect of the lithium supplement on improving the charge/discharge performance of the secondary battery, the present inventors have found that when a specific lithium supplement is used, adding a specific additive into the positive electrode film and/or electrolyte solution of the secondary battery can improve the utilization efficiency of the specific lithium supplement, thereby further improving the charge/discharge capacity and service life of the secondary battery.

Secondary Battery

An embodiment of the present application provides a secondary battery, which includes a positive electrode plate and an electrolyte solution. The positive electrode plate comprises a positive current collector and a positive electrode film provided on at least one surface of the positive current collector. The positive electrode film comprises a positive electrode active material and a lithium supplement. In which, the lithium supplement is at least one selected from the substances represented by the general formula (I) below.

$$mLi_{x1}O \cdot n(Ni_{y1}Mn_{y2}Co_{y3}Cu_{y4}Fe_{y5})O \quad (I)$$

(In general formula (I), 1≤x1≤2; 0≤y1≤1; 0≤y2≤1; 0≤y3≤1; 0≤y4≤2; 0≤y5≤1; 0.5≤y1+y2+y3+y4+y5≤1; 1≤m≤3; 0≤n/m≤1.)

Further, the positive electrode film and/or the electrolyte solution further includes any one or two or more selected from nitrone derivatives having a structure represented by the formula (II) below in the molecule as an additive (A),

(II)

After careful research, the applicant has unexpectedly found that: according to the present application, by including at least one selected from the substances represented by the general formula (I) above in the secondary battery as a lithium supplement, and including any one or two or more of the nitrone derivatives having the structure represented by the formula (II) above in the molecule in the positive electrode film and/or electrolyte solution of the secondary battery as an additive (A), not only can the lithium supplement make up for the lithium source consumed by the formation of a solid electrolyte film (SEI) on the surface of the negative electrode during the first charging process, but also the additive (A) can improve the utilization efficiency of the lithium supplement, so as to further improve the charge/discharge capacity and service life of the secondary battery.

Although the mechanism is not clear yet, the present applicant speculates that when the lithium ions of the lithium supplement leave their original positions to participate in the charging and discharging of a lithium ion battery, free electrons or negative ions will be generated correspondingly, and the $N^+$ structure in the above-mentioned nitrone derivatives having the structure represented by the formula (II) above in the molecule can neutralize these free electrons or negative ions, thereby reducing other harmful side reactions caused by these free electrons or negative ions. On the other hand, since the above-mentioned nitrone derivatives having the structure represented by the formula (II) above in the molecule have a large molecular weight, after neutralizing these free electrons or negative ions, they will not produce other free harmful small molecules, and they will not produce gases that endanger the safety of the battery, but will be stably present in the positive electrode plate or electrolyte solution; therefore, there is no harmful effect on the cycle of the secondary battery. Therefore, by including the above-mentioned nitrone derivatives having a structure represented by the formula (II) above in the molecule in the positive electrode film or electrolyte solution as an additive (A), the utilization efficiency of a specific lithium supplement can be reliably improved, thereby improving the charge/discharge capacity, as well as the safety performance and service life of the secondary battery.

In any embodiment, the molar content N1 of the lithium supplement and the molar content N2 of the additive (A) satisfy the following relational expression: 0.1≤N2/(N1×m×x1)≤0.5; optionally, N1 and N2 satisfy the following relational expression: 0.25≤N2/(N1×m×x1)≤0.31. Therefore, the harmful side reaction caused by the migration of lithium ions of the lithium supplement can be greatly reduced, and the utilization efficiency of the lithium supplement can be further improved.

In some embodiments, the lithium supplement is at least one selected from $Li_2O$, $Li_2O_2$, $Li_5FeO_4$, and $Li_2Cu_{0.5}Ni_{0.5}O_2$; in some embodiments, the lithium supplement is at least one selected from $Li_2O$ and $Li_2O_2$. Therefore, it can not only make up for the loss of recyclable lithium due to a large amount of lithium source consumed by the formation of a solid electrolyte film layer (SEI) on the surface of the negative electrode during the first charging process, but also when these lithium supplements are used, their utilization efficiency can be particularly improved by adding the additive (A) to the positive electrode film or electrolyte solution, thereby further improving the charge/discharge capacity and the service life of the secondary battery.

In some embodiments, the volume average particle size Dv50 of the lithium supplement is greater than the volume average particle size Dv50 of the positive electrode active material. Optionally, the volume average particle size Dv50 of the lithium supplement is 5 μm-15 μm. Therefore, the delithiation efficiency of the lithium supplement can be further improved, and the effect of the additive (A) on improving the utilization efficiency of the lithium supplement can be improved.

In some embodiments, from the viewpoint of improving the utilization efficiency of the lithium supplement, the specific surface area of the lithium supplement is 0.5 m²/g-20 m²/g, optionally 1 m²/g-2 m²/g. Further, from the viewpoint of improving the effect of the lithium supplement to make up for the loss of recyclable lithium during the first charging process, the purity of the lithium supplement is greater than or equal to 90%; in some embodiments greater than or equal to 95%. When the purity of the lithium supplement is lower than 90%, there are many inert impurities (LiOH, Li$_2$CO$_3$, etc.) on the surface of the material, which reduces the lithium-supplementing effect of the lithium supplement; when the content of the lithium supplement is higher than 97%, the influence of impurities can be ignored.

The above-mentioned lithium supplement represented by general formula (I) has a strong alkalinity, which may damage the processability of the secondary battery, and can be coated with a single layer or multiple layers on the outside. The coating layer can be selected from metal fluoride AlF$_3$, oxides (V$_2$O$_5$, Al$_2$O$_3$, ZrO$_2$, TiO$_2$, ZnO, Co$_3$O$_4$, SiO$_2$), phosphates (AlPO$_4$, FePO$_4$, Co$_3$(PO$_4$)$_2$, Ni$_3$(PO$_4$)$_2$), lithium salts (Li$_3$PO$_4$, Li$_2$MnO$_3$, LiAlO$_2$, Li$_2$TiO$_3$, Li$_2$ZrO$_3$), single-layer coating of certain elementary substances (carbon, graphene, carbon nanotubes), or double-layer coating (Al$_2$O$_3$ and PEDOT (polyethylene glycol-modified poly-3,4-ethylenedioxythiophene), Li$_3$PO$_4$ and PPy (conductive polymer polypyrrole) etc.).

In some embodiments, the first delithiation capacity of the lithium supplement is 300-1500 mAh/g, optionally 400-900 mAh/g. Therefore, such a lithium supplement is more feasible for application. The first charge/discharge voltage range of the lithium supplement is 2.0V-4.5V (vs Li), optionally 3.0V-3.75V (vs Li). Therefore, the lithium supplement can be further better matched to the corresponding potential of the positive electrode active material, thereby improving the supplementary effect of the lithium supplement on the lithium source consumption.

From the point of view of giving full play to the supplementary effect of the lithium supplement on the lithium source consumption, the mass percentage content $W_L$ of the positive electrode lithium supplement in the positive electrode plate is in some embodiments 0.1 mass %-10 mass %, in some embodiments 2 mass %-7 mass %. If the content of the lithium supplement is too low, the loss of active lithium in the positive electrode cannot be supplemented, but if the content is too high, it may cause insufficient reversible lithium intercalation vacancies in the positive electrode, thereby affecting the energy density of the battery cell.

In some embodiments, the above-mentioned nitrone derivatives are compounds represented by the general formula (II') below, and/or cyclic nitrone derivatives with 4-8 membered rings.

(II')

In formula (II'), R$_1$ and R$_2$ are each independently at least one selected from methyl, ethyl, propyl, isopropyl, butyl, isobutyl, tert-butyl, fluoromethyl, fluoroethyl, fluoropropyl, methylhydroxy, ethylhydroxy, phenyl, tolyl, fluorophenyl, methoxy, ethoxy, 1,1-dimethyl-ethanol group, 1,1-dimethyl-propanol group, 1,1-dimethyl-butanol group, 1-methyl-propanol group and tert-butyl triol group.

In some embodiments, the additive (A) is at least one selected from N-tert-butyl-α-phenylnitrone, N-tert-butyl-α-4-fluorophenylnitrone, and 5,5-dimethyl-1-pyrroline oxide. Therefore, the utilization efficiency of the lithium supplement added into the secondary battery can be reliably improved, thereby improving the charge/discharge capacity and service life of the secondary battery. The additive (A) can be added to the positive electrode film or to the electrolyte solution. From the viewpoint of improving the effect of the additive (A) on improving the utilization efficiency of the lithium supplement, the additive can be added to the electrolyte solution.

[Positive Electrode Plate]

The positive electrode plate comprises a positive current collector and a positive film layer provided on at least one surface of the positive current collector. As examples, the positive current collector has two surfaces opposite in its own thickness direction, and the positive film layer is provided on either or both of the two opposite surfaces of the positive current collector.

In the embodiment of the present application, the positive film layer includes a positive electrode active material and the lithium supplement represented by the general formula (I) above. Optionally, in some embodiments, the positive film layer may further comprises the above-mentioned additive (A).

In some embodiments, the positive current collector can be a metal foil or a composite current collector. For example, as a metal foil, an aluminum foil can be used. The composite current collector may comprise a polymer material substrate and a metal layer formed on at least one surface of the polymer material substrate. The composite current collector can be formed by forming a metal material (aluminum, an aluminum alloy, nickel, a nickel alloy, titanium, a titanium alloy, silver and a silver alloy, etc.) on a polymer material substrate (such as polypropylene (PP), polyethylene terephthalate (PET), polybutylene terephthalate (PBT), polystyrene (PS), polyethylene (PE), etc.).

In some embodiments, the positive electrode active material may be a positive electrode active material known in the art for batteries. As an example, the positive electrode active material may include at least one of the following materials: lithium-containing phosphates of an olivine structure, lithium transition metal oxides and their respective modified compounds. However, the present application is not limited to these materials, and other conventional materials that can be used as positive electrode active materials for batteries may also be used. These positive electrode active materials may be used alone or in combination of two or more. Herein, examples of lithium transition metal oxides may include, but are not limited to, at least one of lithium cobalt oxide (e.g. $LiCoO_2$), lithium nickel oxide (e.g. $LiNiO_2$), lithium manganese oxide (e.g. $LiMnO_2$, $LiMn_2O_4$), lithium nickel cobalt oxide, lithium manganese cobalt oxide, lithium nickel manganese oxide, lithium nickel cobalt manganese oxide (e.g. $LiNi_{1/3}Co_{1/3}Mn_{1/3}O_2$ (also referred to as $NCM_{333}$), $LiNi_{0.5}Co_{0.2}Mn_{0.3}O_2$ (also referred to as $NCM_{523}$), $LiNi_{0.5}Co_{0.25}Mn_{0.25}O_2$ (also referred to as $NCM_{211}$), $LiNi_{0.6}Co_{0.2}Mn_{0.2}O_2$ (also referred to as $NCM_{622}$), $LiNi_{0.8}Co_{0.1}Mn_{0.1}O_2$ (also referred to as $NCM_{811}$)), lithium nickel cobalt aluminum oxide (e.g. $LiNi_{0.85}Co_{0.15}Al_{0.05}O_2$), and modified compounds thereof, and the like. Examples of lithium-containing phosphates of olivine structure may include, but are not limited to, at least one of lithium iron phosphate (e.g. $LiFePO_4$ (also referred to as LFP)), lithium iron phosphate and carbon composites, lithium manganese phosphate (e.g. $LiMnPO_4$), lithium manganese phosphate and carbon composites, lithium iron manganese phosphate, and lithium iron manganese phosphate and carbon composites.

In some embodiments, the positive film layer may optionally comprise a binder. As an example, the binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylate resin.

In some embodiments, the positive film layer also optionally comprises a conductive agent. As an example, the conductive agent may include at least one of superconducting carbon, acetylene black, carbon black, Ketjen black, carbon dots, carbon nanotubes, graphene, and carbon nanofibers.

In some embodiments, the positive electrode plate can be prepared as follows: the above-mentioned components for preparing the positive electrode plate, such as a positive electrode active material, a conductive agent, a lithium supplement, a binder and any other components (optionally comprising an additive (A)), are dispersed in a solvent (e.g. N-methylpyrrolidone) to form a positive electrode slurry; and the positive electrode slurry is coated on the positive current collector, and a positive electrode plate can be obtained after procedures such as drying and cold pressing, wherein the coating amount of the positive electrode material is usually 12-30 $mg/cm^2$.

[Negative Electrode Plate]

The negative electrode plate comprises a negative current collector and a negative film layer provided on at least one surface of the negative current collector, wherein the negative film layer comprises a negative electrode active material.

As an example, the negative current collector has two surfaces opposite in its own thickness direction, and the negative film layer is provided on either or both of the two opposite surfaces of the negative current collector.

In some embodiments, the negative current collector may be a metal foil or a composite current collector. For example, as a metal foil, a copper foil can be used. The composite current collector may comprise a polymer material substrate and a metal layer formed on at least one surface of the polymer material substrate. The composite current collector can be formed by forming a metal material (copper, a copper alloy, nickel, a nickel alloy, titanium, a titanium alloy, silver and a silver alloy, etc.) on a polymer material substrate (e.g., polypropylene (PP), polyethylene terephthalate (PET), polybutylene terephthalate (PBT), polystyrene (PS), polyethylene (PE), etc.).

In some embodiments, the negative electrode active material can be a negative electrode active material known in the art for batteries. As an example, the negative electrode active material may include at least one of the following materials: artificial graphite, natural graphite, soft carbon, hard carbon, a silicon-based material, a tin-based material and lithium titanate, etc. The silicon-based material may be at least one selected from elemental silicon, silicon oxides, silicon carbon composites, silicon nitrogen composites and silicon alloys. The tin-based material may be at least one selected from elemental tin, tin oxides, and tin alloys. However, the present application is not limited to these materials, and other conventional materials that can be used as negative electrode active materials for batteries can also be used. These negative electrode active materials may be used alone or in combination of two or more.

In some embodiments, the negative film layer may optionally comprise a binder. The binder may be at least one selected from a butadiene styrene rubber (SBR), polyacrylic acid (PAA), sodium polyacrylate (PAAS), polyacrylamide (PAM), polyvinyl alcohol (PVA), sodium alginate (SA), polymethacrylic acid (PMAA) and carboxymethyl chitosan (CMCS).

In some embodiments, the negative film layer may optionally comprise a conductive agent. The conductive agent may be at least one selected from superconductive carbon, acetylene black, carbon black, ketjenblack, carbon dots, carbon nanotubes, graphene, and carbon nanofibers.

In some embodiments, the negative film layer may optionally comprise other auxiliary agents, such as thickener (e.g. sodium carboxymethyl cellulose (CMC-Na)) and the like.

In some embodiments, the negative electrode plate can be prepared as follows: the above-mentioned components for preparing the negative electrode plate, such as a negative electrode active material, a conductive agent, a binder and any other components, are dissolved in a solvent (e.g. deionized water) to form a negative electrode slurry; and the negative electrode slurry is coated on the negative current collector, and a negative electrode plate can be obtained after procedures such as drying and cold pressing, wherein the coating amount of the negative electrode material is usually 5-14 $mg/cm^2$.

Electrolyte

The electrolyte is located between the positive electrode plate and the negative electrode plate and functions for conducting ions. The type of the electrolyte is not specifically limited in the present application, and can be selected according to actual requirements.

In some embodiments, an electrolyte solution is used as the electrolyte. In which, the electrolyte solution comprises an electrolyte salt and a solvent.

In some embodiments, the electrolyte solution optionally comprises the above-mentioned additive (A).

In some embodiments, the electrolyte solution comprises dimethyl carbonate (DMC) as a solvent. This is because when the content of the additive (A) contained in the positive electrode film or the electrolyte solution exceeds 1 mass %, the direct current resistance (DCR) of the secondary battery will increase, the electric conductivity will decrease, and the migration of lithium ions will be hindered, so it will lead to easy lithium precipitation at the anode interface. By including dimethyl carbonate in the electrolyte solution as a solvent, the electrical conductivity of the electrolyte solution can be improved, and the problem of lithium precipitation at the anode interface can be further alleviated. The content of the dimethyl carbonate in the electrolyte solution is 20 mass %-80 mass %, optionally 60 mass %-70 mass %. The higher the content of dimethyl carbonate contained in the electrolyte solution, the higher the electrical conductivity. However, since dimethyl carbonate is easy to crystallize at low temperature, if the content of dimethyl carbonate is too high, the low-temperature direct current resistance of the secondary battery will be deteriorated. Moreover, the boiling point of dimethyl carbonate is low. If the content of dimethyl carbonate is too high, the high-temperature storage performance of the secondary battery will be deteriorated, and high-temperature gas generation will easily occur.

In some embodiments, the solvent may also contains at least one selected from ethylene carbonate, propylene carbonate, ethyl methyl carbonate, diethyl carbonate, dipropyl carbonate, methyl propyl carbonate, ethyl propyl carbonate, butylene carbonate, fluoroethylene carbonate, methyl formate, methyl acetate, ethyl acetate, propyl acetate, methyl propionate, ethyl propionate, propyl propionate, methyl butyrate, ethyl butyrate, 1,4-butyrolactone, sulfolane, dimethyl sulfone, ethyl methyl sulfone, and diethyl sulfone.

In some embodiments, the electrolyte salt may be at least one selected from lithium hexafluorophosphate, lithium tetrafluoroborate, lithium perchlorate, lithium hexafluoroarsenate, lithium bisfluorosulfonimide, lithium bistrifluoromethanesulfonimide, lithium trifluoromethanesulfonate, lithium difluorophosphate, lithium difluorooxalate borate, lithium dioxalate borate, lithium difluorodioxalate phosphate and lithium tetrafluorooxalate phosphate.

In some embodiments, the electrolyte solution further optionally comprises other additives. For example, other additives may include a negative electrode film-forming additive and a positive electrode film-forming additive, and may further include an additive that can improve certain performances of the battery, such as an additive that improves the overcharge performance of the battery, or an additive that improves the high temperature or low-temperature performance of the battery.

Separator

In some embodiments, the secondary battery further comprises a separator. The type of the separator is not particularly limited in the present application, and any well known porous-structure separator with good chemical stability and mechanical stability may be selected.

In some embodiments, the material of the separator may be at least one selected from glass fibers, non-woven fabrics, polyethylene, polypropylene and polyvinylidene fluoride. The separator may be a single-layer film and also a multi-layer composite film, and is not limited particularly.

When the separator is a multi-layer composite film, the materials in the respective layers may be same or different, which is not limited particularly.

In some embodiments, the positive electrode plate, the negative electrode plate and the separator can be made into the electrode assembly by a winding process or a lamination process.

In some embodiments, the secondary battery may comprise an outer package. The outer package can be used to encapsulate the above-mentioned electrode assembly and electrolyte.

In some implementations, the outer package of the secondary battery may be a hard shell, such as a hard plastic shell, an aluminum shell, or a steel shell. The outer package of the secondary battery may also be a soft bag, such as a pouch-type soft bag. The material of the soft bag may be plastics, and the examples of plastics may include polypropylene, polybutylene terephthalate, and polybutylene succinate, etc.

The shape of the secondary battery is not particularly limited in the present application, and may be cylindrical, square or of any other shape. For example, FIG. 1 shows a secondary battery 5 with a square structure as an example.

Figure 2:
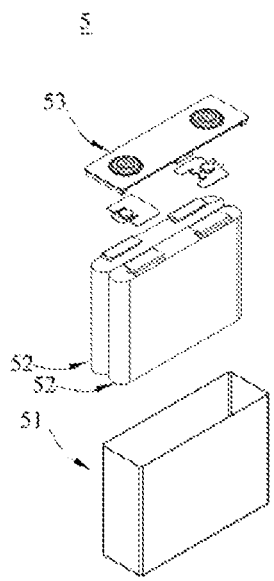
FIG. 2 is an exploded view of the secondary battery in the embodiment of the present application as shown in FIG. 1.

In some embodiments, referring to FIG. 2, an outer package may comprise a housing 51 and a cover plate 53. Herein, the housing 51 may comprise a bottom plate and side plates connected to the bottom plate, and the bottom plate and the side plates enclose to form an accommodating cavity. The housing 51 has an opening in communication with the accommodating cavity, and the cover plate 53 can cover the opening to close the accommodating cavity. The positive electrode plate, the negative electrode plate and the separator can be subjected to a winding process or a laminating process to form an electrode assembly 52. The electrode assembly 52 is encapsulated in the accommodating cavity. The electrolyte is infiltrated into the electrode assembly 52. The number of the electrode assemblies 52 contained in the secondary battery 5 may be one or more, and can be selected by those skilled in the art according to actual requirements.

In some embodiments, the secondary battery can be assembled into a battery module, and the number of the secondary batteries contained in the battery module may be one or more, and the specific number can be selected by those skilled in the art according to the application and capacity of the battery module.

Figure 3:
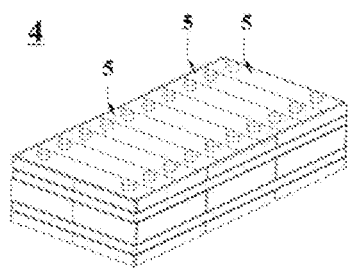
FIG. 3 is a schematic diagram of a battery module in an embodiment of the present application.

FIG. 3 shows a battery module 4 as an example. Referring to FIG. 3, in the battery module 4, a plurality of secondary batteries 5 may be arranged in sequence in the length direction of the battery module 4. Apparently, the secondary batteries may also be arranged in any other manner. Furthermore, the plurality of secondary batteries 5 may be fixed by fasteners.

Optionally, the battery module 4 may also comprise a housing with an accommodating space, and a plurality of secondary batteries 5 are accommodated in the accommodating space.

In some embodiments, the above battery module may also be assembled into a battery pack, the number of the battery modules contained in the battery pack may be one or more, and the specific number can be selected by those skilled in the art according to the application and capacity of the battery pack.

Figure 4:
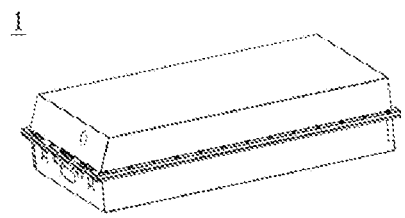
FIG. 4 is a schematic diagram of a battery pack in an embodiment of the present application.
Figure 5:
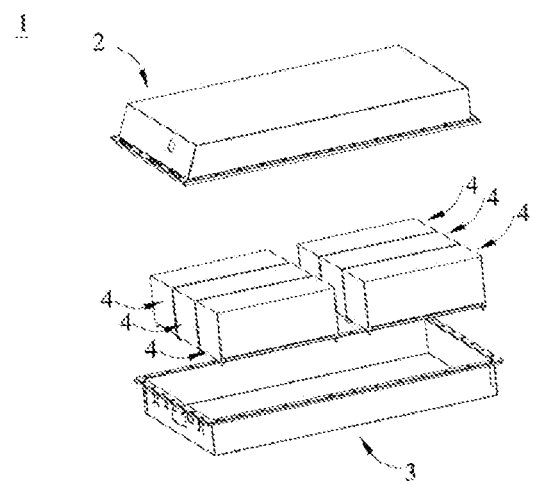
FIG. 5 is an exploded view of the battery pack in the embodiment of the present application as shown in FIG. 4.

FIGS. 4 and 5 show a battery pack 1 as an example. Referring to FIG. 4 and FIG. 5, the battery pack 1 may comprise a battery box and a plurality of battery modules 4 provided in the battery box. The battery box comprises an upper box body 2 and a lower box body 3, wherein the upper box body 2 can cover the lower box body 3 to form a closed space for accommodating the battery modules 4. A plurality of battery modules 4 may be arranged in the battery box in any manner.

In addition, the present application further provides a power consuming device. The power consuming device comprises at least one of the secondary battery, battery module, or battery pack provided by the present application. The secondary battery, battery module or battery pack can be used as a power source of the power consuming device or as an energy storage unit of the power consuming device. The power consuming device may include a mobile device (e.g., a mobile phone, a laptop computer, etc.), an electric vehicle (e.g., a pure electric vehicle, a hybrid electric vehicle, a plug-in hybrid electric vehicle, an electric bicycle, an electric scooter, an electric golf cart, an electric truck), an electric train, ship, and satellite, an energy storage system, and the like, but is not limited thereto.

As for the power consuming device, the secondary battery, battery module or battery pack can be selected according to the usage requirements thereof.

Figure 6:
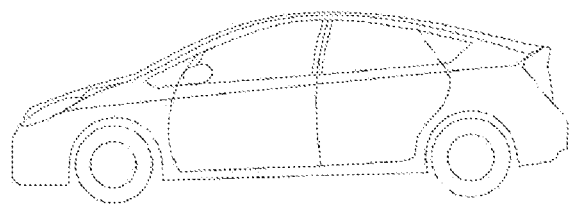
FIG. 6 is a schematic diagram of a power consuming device in an embodiment of the present application.

FIG. 6 shows a power consuming device as an example. The power consuming device may be a pure electric vehicle, a hybrid electric vehicle, a plug-in hybrid electric vehicle or the like. In order to meet the requirements of the power consuming device for a high power and a high energy density of a secondary battery, a battery pack or a battery module may be used.

As another example, the electrical apparatus may be a mobile phone, a tablet computer, a laptop computer, etc. The electrical apparatus is generally required to be thin and light, and may use the secondary battery as a power supply.

EXAMPLES

Hereinafter, the examples of the present application will be explained. The examples described below are exemplary and are merely for explaining the present application, and should not be construed as limiting the present application. The examples in which techniques or conditions are not specified are based on the techniques or conditions described in documents in the art or according to the product introduction. The reagents or instruments used therein for which manufacturers are not specified are all conventional products that are commercially available.

Blank Example 1-1, Comparative Example 1-1, and Examples 1-1-1-12

Lithium supplement: $Li_5FeO_4$ {the corresponding general formula (I) is: $2.5Li_2O \cdot 1.5Fe_{0.67}O$, that is, m=2.5, x1=2, n=1.5, y5=0.67, and the rest are 0.}

Blank Example 1-1

1) Preparation of a Positive Electrode Plate $LiFePO_4$(LFP) (with a volume average particle size of 1.2 μm), a conductive agent of acetylene black, and a binder (polyvinylidene fluoride (PVDF)) are added in N-methylpyrrolidone (NMP) solvent at a weight ratio of 97:1:2, fully stirred and evenly mixed, then coated on a Al foil with a surface density of 19.4 mg/cm$^2$, dried and cold pressed to obtain a positive electrode plate, wherein the compacted density is 2.4 g/cm$^3$.

2) Preparation of a Negative Electrode Plate

An active material of artificial graphite, a conductive agent of acetylene black, a binder of styrene-butadiene rubber (SBR), and a thickener of carbon methyl cellulose sodium (CMC) are fully stirred and evenly mixed in a deionized water solvent system at a weight ratio of 96.5:0.7:1.8:1, then coated on a Cu foil with a surface density of 8.8 mg/cm$^2$, dried and cold pressed to obtain a negative electrode plate, wherein the compacted density is 1.6 g/cm$^3$.

3) Separator

A PE/PP porous polymer thin film with a thickness of 12 μm is used as the separator.

4) Electrolyte Solution

Dimethyl carbonate (DMC), ethylene carbonate (EC) and ethylmethyl carbonate (EMC) are mixed at a mass ratio of 60/20/20 as a solvent, and 1.1 M $LiPF_6$ lithium salt is added and dissolved therein as an electrolyte to form an electrolyte solution.

The positive electrode plate, the separator and the negative electrode plate are stacked in sequence, such that the separator is located between the positive electrode and the negative electrode to play a role of isolation, and then winding is performed to obtain a bare cell. The bare cell is placed in the outer package of the secondary battery, and the prepared electrolyte solution is injected and packaged to obtain the secondary battery of blank example 1-1.

Comparative Example 1-1

The secondary battery of comparative example 1-1 is obtained in the same steps as that of blank example 1-1, except that 2 mass % of $Li_5FeO_4$ (relative to the amount of $LiFePO_4$ as the positive active material) is further added in N-methylpyrrolidone (NMP) solvent as a lithium supplement during the preparation of the positive electrode plate, fully stirred and evenly mixed, then coated on a Al foil with a surface density of 19.4 mg/cm$^2$, dried and cold pressed, wherein the compacted density is 2.4 g/cm$^3$.

Example 1-1

The secondary battery of example 1-1 is obtained in the same steps as that of comparative example 1-1, except that in the preparation process of the electrolyte solution, N-tert-butyl-α-phenylnitrone is further added as an additive (A). In which, the molar content N1 of the lithium supplement and the molar content N2 of the additive (A) satisfy the following relational expression: N2/(N1×2.5×2)=0.1.

Examples 1-2-1-7

The secondary battery of examples 1-2-1-7 is obtained in the same steps as that of example 1-1, except that the molar content N2 of N-tert-butyl-α-phenylnitrone added is changed to satisfy the value of [N2/(N1×2.5×2)] shown in table 1. In which, N1 represents the molar content of the lithium supplement.

Example 1-8

The secondary battery of example 1-8 is obtained in the same steps as that of example 1-1, except that N-tert-butyl-α-phenylnitrone is replaced with N-tert-butyl-α-4-fluoro-phenylnitrone, and its molar content N2 satisfies [N2/(N1×2.5×2)]=0.28. In which, N1 represents the molar content of the lithium supplement.

Example 1-9

The secondary battery of example 1-9 is obtained in the same steps as that of example 1-1, except that N-tert-butyl-α-phenylnitrone is replaced with 5,5-dimethyl-1-pyrroline oxide, and its molar content N2 satisfies [N2/(N1×2.5×2)]=0.28. In which, N1 represents the molar content of the lithium supplement.

Examples 1-10-1-12

The secondary battery of examples 1-10-1-12 is obtained in the same steps as that of comparative example 1-1, except that N-tert-butyl-α-phenylnitrone is further added into N-methylpyrrolidone (NMP) solvent as the additive (A) during the preparation of the positive electrode plate, and its molar content N2 satisfies the value of [N2/(N1×2.5×2)] shown in table 1. In which, N1 represents the molar content of the lithium supplement.

Test Method:

1. Calculation of Utilization Efficiency of Lithium Supplement

Test samples of the secondary batteries are prepared in the same way as in the above-mentioned each example, respectively.

The secondary battery of blank example 1-1 (negative electrode coating weight $a_0$, positive electrode coating weight $c_0$) is charged at a rate of 1 C to a voltage of 3.65 V at normal temperature, then the battery is disassembled to move the negative electrode plate, which is tested for inductively coupled plasma emission spectrometer (ICP) using an inductively coupled plasma emission spectrometer (ICAP7400) manufactured by Thermo Fisher scientific in the United States, so as to obtain the mass percentage $X_0$ of lithium contained therein.

The battery of comparative example and example (negative electrode coating weight $a_n$, positive electrode coating weight $c_n$, and the mass percentage of the lithium supplement is L) is charged at a rate of 1 C to a voltage of 3.65 V at room temperature, then the battery is disassembled to move the negative electrode plate, which is tested for inductively coupled plasma emission spectrometer (ICP), so as to obtain the mass percentage $X_n$ of lithium contained therein. According to the following calculation formula, the utilization efficiency of the lithium supplement of each comparative example and example is calculated and recorded in table 1.

Proportion of active material lithium source $Y=(c_n(1-L)\times a_0 \times X_0)/(a_n \times c_0)$ Utilization efficiency of lithium supplement $=(X_n-Y)/(X_0-Y)$ 2. Test of Specific Charge/Discharge Capacity Test samples of the secondary batteries are prepared in the same way as in the above-mentioned each example, respectively.

Each secondary battery is charged at normal temperature (25° C.) at a constant current rate of 0.33 C to the end-of-charge voltage, and then charged at a constant voltage to 0.05 C; the charging capacity Ec0 of the first cycle is measured, and the specific charge capacity can be obtained by dividing Ec0 by the mass of the positive electrode active material of the battery.

The above-mentioned secondary battery that has been charged is taken, and discharged at a constant current of 0.33 C to the end-of-discharge voltage, and the discharge capacity Ed0 of the first cycle is measured. The specific discharge capacity can be obtained by dividing Ed0 by the mass of the positive electrode active material of the battery.

The tests of specific charge capacity and specific discharge capacity are repeated 5 times, and the average values are recorded in table 1, respectively, as the specific charge capacity and specific discharge capacity of each example.

Specific charge capacity (mAh/g)=Ec0/mass of positive active material

Specific discharge capacity (mAh/g)=Ed0/mass of positive active material

3. Capacity Retention Rate Test after Storage at 60° C. for 100 Days

The secondary battery to be tested is charged to a voltage of 3.65 V at a rate of 1 C at room temperature, and then discharged to a voltage of 2.5 V at a rate of 1 C, the reversible capacity E0 can be measured by reading directly from the instrument. The fully charged secondary battery is placed in an oven at 60° C. and stored for 100 days, then the battery is taken out, and its reversible capacity is immediately tested and recorded as En.

The capacity retention rate of the battery after storage at 60° C. for 100 days is calculated according to the following formula and shown in table 1.

$$\varepsilon = (En-E0)/E0 \times 100\%.$$

TABLE 1

| | Lithium supplement | Additive (A) | Additive (A): lithium supplement N2/ (N1 × m × x1) | Adding method | Utilization efficiency of lithium supplement | Specific charge capacity (mAh/g) | Specific discharge capacity (mAh/g) | Capacity retention rate after storage at 60° C. for 100 days |
|---|---|---|---|---|---|---|---|---|
| Blank example 1-1 | / | / | — | / | / | 156 | 140 | 90.1% |
| Comparative Example 1-1 | $Li_5FeO_4$ | | — | / | 72.3% | 164 | 142 | 94.8% |
| Example 1-1 | $Li_5FeO_4$ | N-tert-butyl-α-phenylnitrone | 0.1 | In electrolyte solution | 83.3% | 166 | 144 | 96.1% |
| Example 1-2 | $Li_5FeO_4$ | N-tert-butyl-α-phenylnitrone | 0.25 | In electrolyte solution | 86.1% | 168 | 146 | 97.2% |
| Example 1-3 | $Li_5FeO_4$ | N-tert-butyl-α-phenylnitrone | 0.28 | In electrolyte solution | 91.2% | 169 | 147 | 98.5% |
| Example 1-4 | $Li_5FeO_4$ | N-tert-butyl-α-phenylnitrone | 0.31 | In electrolyte solution | 88.3% | 168 | 145 | 96.8% |
| Example 1-5 | $Li_5FeO_4$ | N-tert-butyl-α-phenylnitrone | 0.4 | In electrolyte solution | 87.4% | 166 | 143 | 96.0% |
| Example 1-6 | $Li_5FeO_4$ | N-tert-butyl-α-phenylnitrone | 0.5 | In electrolyte solution | 82.5% | 165 | 139 | 95.3% |
| Example 1-7 | $Li_5FeO_4$ | N-tert-butyl-α-phenylnitrone | 1 | In electrolyte solution | 75.2% | 164 | 132 | 94.4% |
| Example 1-8 | $Li_5FeO_4$ | N-tert-butyl-α-4-fluorophenylnitrone | 0.28 | In electrolyte solution | 89.6% | 168 | 146 | 97.9% |
| Example 1-9 | $Li_5FeO_4$ | 5,5-dimethyl-1-pyrroline oxide | 0.28 | In electrolyte solution | 87.7% | 167 | 144 | 96.8% |
| Example 1-10 | $Li_5FeO_4$ | N-tert-butyl-α-phenylnitrone | 0.25 | In positive electrode film | 83.3% | 167 | 144 | 97.1% |

TABLE 1-continued

|  | Lithium supplement | Additive (A) | Additive (A): lithium supplement N2/ (N1 × m × x1) | Adding method | Utilization efficiency of lithium supplement | Specific charge capacity (mAh/g) | Specific discharge capacity (mAh/g) | Capacity retention rate after storage at 60° C. for 100 days |
|---|---|---|---|---|---|---|---|---|
| Example 1-11 | $Li_5FeO_4$ | N-tert-butyl-α-phenylnitrone | 0.28 | In positive electrode film | 88.5% | 168 | 146 | 98.3% |
| Example 1-12 | $Li_5FeO_4$ | N-tert-butyl-α-phenylnitrone | 0.31 | In positive electrode film | 86.1% | 166 | 142 | 96.2% |

From the comparison of the above-mentioned comparative example 1-1 and blank example 1-1 and the comparison of each example and blank example 1-1, it can be seen that by including additives (A) with different types or different contents in secondary batteries added with $Li_5FeO_4$ as the lithium supplement, the utilization efficiency of the lithium supplement, as well as the charge/discharge capacity and service life of the secondary battery can all be improved. In addition, the additive can be added to the electrolyte solution or to the positive electrode film. However, when it is added to the electrolyte solution, it has a better effect on improving the utilization efficiency of the lithium supplement, and relatively higher charge/discharge specific capacity and capacity retention rate can be obtained.

Comparative Example 2-1, and Examples 2-1-2-12

Lithium supplement: $Li_2O_2$ {the corresponding general formula (I) is: m=2, x1=1, and the rest are 0.}

Comparative Example 2-1

The secondary battery of comparative example 2-1 is obtained in the same steps as that of blank example 1-1, except that 3 mass % of $Li_2O_2$ (relative to the amount of $LiFePO_4$ as the positive active material) is further added into a solvent as a lithium supplement during the preparation of the positive electrode plate, fully stirred and evenly mixed, then coated on a Al foil, dried and cold pressed.

Examples 2-1-2-7

The secondary battery of examples 2-1-2-7 is obtained in the same steps as that of example 1-1, except that $Li_2O_2$ is used as the lithium supplement instead, and the amount of the additive (A) is adjusted to one that satisfies the corresponding numerical values (additive (A): lithium supplement) shown in table 2.

Examples 2-8-2-9

The secondary battery of examples 2-8-2-9 is obtained in the same steps as that of example 2-1, except that the additive (A1) is replaced with the additives shown in table 2, and the amount of each additive is adjusted to satisfy the value of [N2/(N1×2.5×2)]=0.28.

Examples 2-10-2-12

The secondary battery of examples 2-10-2-12 is obtained in the same steps as that of example 1-10-1-12, except that $Li_2O_2$ is used as the lithium supplement instead.

The utilization efficiency of the lithium supplement, the charge/discharge specific capacity, the capacity retention rate test, and the overcharge failure SOC are tested according to the same method mentioned above for each comparative example and example, and the results are shown in table 2.

TABLE 2

|  | Lithium supplement | Additive (A) | Additive (A): lithium supplement N2/ (N1 × m × x1) | Adding method | Utilization efficiency of lithium supplement | Specific charge capacity (mAh/g) | Specific discharge capacity (mAh/g) | Capacity retention rate after storage at 60° C. for 100 days |
|---|---|---|---|---|---|---|---|---|
| Blank example 1-1 | / | / | — | / | / | 156 | 140 | 90.1% |
| Comparative example 2-1 | $Li_2O_2$ | / | — | / | 75.8% | 170 | 142 | 96.5% |
| Example 2-1 | $Li_2O_2$ | N-tert-butyl-α-phenylnitrone | 0.1 | In electrolyte solution | 80.6% | 172 | 143 | 97.20% |
| Example 2-2 | $Li_2O_2$ | N-tert-butyl-α-phenylnitrone | 0.25 | In electrolyte solution | 90.4% | 174 | 144 | 98.10% |
| Example 2-3 | $Li_2O_2$ | N-tert-butyl-α-phenylnitrone | 0.28 | In electrolyte solution | 93.5% | 175 | 145 | 98.90% |
| Example 2-4 | $Li_2O_2$ | N-tert-butyl-α-phenylnitrone | 0.31 | In electrolyte solution | 89.9% | 173 | 143 | 98.00% |
| Example 2-5 | $Li_2O_2$ | N-tørt-butyl-α-phenylnitrone | 0.4 | In electrolyte solution | 87.5% | 173 | 141 | 97.30% |
| Example 2-6 | $Li_2O_2$ | N-tert-butyl-α-phenylnitrone | 0.5 | In electrolyte solution | 86.2% | 172 | 139 | 97.00% |
| Example 2-7 | $Li_2O_2$ | N-tert-butyl-α-phenylnitrone | 1 | In electrolyte solution | 83.4% | 171 | 135 | 96.30% |
| Example 2-8 | $Li_2O_2$ | N-tert-butyl-α-4-fluorophenylnitrone | 0.28 | In electrolyte solution | 90.6% | 173 | 144 | 97.40% |

TABLE 2-continued

|  | Lithium supplement | Additive (A) | Additive (A): lithium supplement N2/ (N1 × m × x1) | Adding method | Utilization efficiency of lithium supplement | Specific charge capacity (mAh/g) | Specific discharge capacity (mAh/g) | Capacity retention rate after storage at 60° C. for 100 days |
|---|---|---|---|---|---|---|---|---|
| Example 2-9 | $Li_2O_2$ | 5,5-dimethyl-1-pyrroline oxide | 0.28 | In electrolyte solution | 88.4% | 171 | 143 | 97.20% |
| Example 2-10 | $Li_2O_2$ | N-tert-butyl-α-phenylnitrone | 0.25 | In positive electrode film | 87.0% | 172 | 143 | 97.20% |
| Example 2-11 | $Li_2O_2$ | N-tert-butyl-α-phenylnitrone | 0.28 | In positive electrode film | 90.1% | 174 | 144 | 97.50% |
| Example 2-12 | $Li_2O_2$ | N-tert-butyl-α-phenylnitrone | 0.31 | In positive electrode film | 89.2% | 172 | 142 | 96.90% |

From the comparison of the above-mentioned comparative example 2-1 and blank example 1-1 and the comparison of each example and blank example 1-1 in table 2, it can be seen that by including additives (A) with different types or different contents in secondary batteries added with $Li_2O_2$ as the lithium supplement, the utilization efficiency of the lithium supplement, as well as the charge/discharge capacity and service life of the secondary battery can all be improved. In addition, it is also known that the additive can be added to the electrolyte solution or to the positive electrode film. However, when it is added to the electrolyte solution, it has a better effect on improving the utilization efficiency of the lithium supplement, and relatively higher charge/discharge specific capacity and capacity retention rate can be obtained.

Comparative Example 3-1, and Examples 3-1-3-7

Lithium supplement: $Li_2O$ {the corresponding general formula (I) is: m=1, x1=2, and the rest are 0.}

Comparative Example 3-1

The secondary battery of comparative example 3-1 is obtained in the same steps as that of blank example 1-1, except that 3 mass % of $Li_2O$ (relative to the amount of $LiFePO_4$ as the positive active material) is further added into a solvent as a lithium supplement during the preparation of the positive electrode plate, fully stirred and evenly mixed, then coated on a Al foil, dried and cold pressed.

Examples 3-1-3-7

The secondary battery of examples 3-1-3-7 is obtained in the same steps as that of example 1-1, except that $Li_2O$ is used as the lithium supplement instead, and the amounts of the additives (A) are adjusted to those that satisfies the corresponding (additive (A): lithium supplement) numerical values shown in table 3, respectively.

Comparative Example 4-1, and Examples 4-1-4-7

Lithium supplement: $Li_2Cu_{0.5}Ni_{0.5}O_2$ {the corresponding general formula (I) is: m=1, x1=2, n=1, y1=y4=0.5, and the rest are 0.}

Comparative Example 4-1

The secondary battery of comparative example 4-1 is obtained in the same steps as that of blank example 1-1, except that 3 mass % of $Li_2Cu_{0.5}Ni_{0.5}O_2$ (relative to the amount of $LiFePO_4$ as the positive active material) is further added into a solvent as a lithium supplement during the preparation of the positive electrode plate, fully stirred and evenly mixed, then coated on a Al foil, dried and cold pressed.

Examples 4-1-4-7

The secondary battery of examples 3-1-3-7 is obtained in the same steps as that of example 1-1, except that $Li_2Cu_{0.5}Ni_{0.5}O_2$ is used as the lithium supplement instead, and the amounts of the additives (A) are adjusted to those that satisfies the corresponding (additive (A): lithium supplement) numerical values shown in table 4, respectively.

TABLE 3

|  | Lithium supplement | Additive (A) | Additive (A): lithium supplement N2/ (N1 × m × x1) | Adding method | Utilization efficiency of lithium supplement | Specific charge capacity (mAh/g) | Specific discharge capacity (mAh/g) | Capacity retention rate after storage at 60° C. for 100 days |
|---|---|---|---|---|---|---|---|---|
| Blank example 1-1 | $Li_2O$ | / | — | / | / | 156 | 140 | 90.1% |
| Comparative example 3-1 | $Li_2O$ | / | — | / | 73.5% | 171 | 143 | 95.6% |
| Example 3-1 | $Li_2O$ | N-tert-butyl-α-phenylnitrone | 0.1 | In electrolyte solution | 80.80% | 173 | 144 | 97.50% |
| Example 3-2 | $Li_2O$ | N-tert-butyl-α-phenylnitrone | 0.2 | In electrolyte solution | 89.70% | 175 | 145 | 98.00% |
| Example 3-3 | $Li_2O$ | N-tert-butyl-α-phenylnitrone | 0.28 | In electrolyte solution | 92.00% | 178 | 146 | 98.80% |
| Example 3-4 | $Li_2O$ | N-tert-butyl-α-phenylnitrone | 0.31 | In electrolyte solution | 90.40% | 176 | 145 | 97.80% |

TABLE 3-continued

| | Lithium supplement | Additive (A) | Additive (A): lithium supplement N2/ (N1 × m × x1) | Adding method | Utilization efficiency of lithium supplement | Specific charge capacity (mAh/g) | Specific discharge capacity (mAh/g) | Capacity retention rate after storage at 60° C. for 100 days |
|---|---|---|---|---|---|---|---|---|
| Example 3-5 | $Li_2O$ | N-tert-butyl-α-phenylnitrone | 0.4 | In electrolyte solution | 88.20% | 175 | 142 | 96.90% |
| Example 3-6 | $Li_2O$ | N-tert-butyl-α-phenylnitrone | 0.5 | In electrolyte solution | 86.90% | 174 | 140 | 96.00% |
| Example 3-7 | $Li_2O$ | N-tert-butyl-α-phenylnitrone | 1 | In electrolyte solution | 83.10% | 173 | 138 | 95.20% |

TABLE 4

| | Lithium supplement | Additive (A) | Additive (A): lithium supplement N2/ (N1 × m × x1) | Adding method | Utilization efficiency of lithium supplement | Specific charge capacity (mAh/g) | Specific discharge capacity (mAh/g) | Capacity retention rate after storage at 60° C. for 100 days |
|---|---|---|---|---|---|---|---|---|
| Blank example 1-1 | / | / | — | / | / | 156 | 140 | 90.1% |
| Comparative example 4-1 | $Li_2Cu_{0.5}Ni_{0.5}O_2$ | / | — | / | 71.8% | 160 | 142 | 93.2% |
| Example 4-1 | $Li_2Cu_{0.5}Ni_{0.5}O_2$ | N-tert-butyl-α-phenylnitrone | 0.1 | In electrolyte solution | 81.80% | 161 | 143 | 95.90% |
| Example 4-2 | $Li_2Cu_{0.5}Ni_{0.5}O_2$ | N-tert-butyl-α-phenylnitrone | 0.25 | In electrolyte solution | 87.20% | 163 | 144 | 96.70% |
| Example 4-3 | $Li_2Cu_{0.5}Ni_{0.5}O_2$ | N-tert-butyl-α-phenylnitrone | 0.28 | In electrolyte solution | 89.60% | 165 | 145 | 97.10% |
| Example 4-4 | $Li_2Cu_{0.5}Ni_{0.5}O_2$ | N-tert-butyl-α-phenylnitrone | 0.31 | In electrolyte solution | 88.10% | 163 | 143 | 96.20% |
| Example 4-5 | $Li_2Cu_{0.5}Ni_{0.5}O_2$ | N-tert-butyl-α-phenylnitrone | 0.4 | In electrolyte solution | 86.30% | 163 | 141 | 95.10% |
| Example 4-6 | $Li_2Cu_{0.5}Ni_{0.5}O_2$ | N-tert-butyl-α-phenylnitrone | 0.5 | In electrolyte solution | 84.70% | 161 | 140 | 94.30% |
| Example 4-7 | $Li_2Cu_{0.5}Ni_{0.5}O_2$ | N-tert-butyl-α-phenylnitrone | 1 | In electrolyte solution | 81.40% | 160 | 138 | 93% |

From the comparison of the above-mentioned comparative examples and blank example 1-1 and the comparison between each example and blank example 1-1 in the tables 3 and 4, it can be seen that by including the additive (A) in the secondary battery added with $Li_2O$ or $Li_2Cu_{0.5}Ni_{0.5}O_2$ as the lithium supplement, the utilization efficiency of the lithium supplement, as well as the charge/discharge capacity and service life of the secondary battery can all be improved.

In addition, it can be seen from the results of tables 1-4 that when the molar content N1 of the lithium supplement and the molar content N2 of the additive (A) satisfy N2/(N1×m×x1)≥0.25, especially 0.25≤N2/(N1×m×x1)≤0.5, the effect of improving the utilization efficiency of the lithium supplement is higher, and the charge/discharge capacity and service life of the secondary battery are also better. This is because when N2/(N1×m×x1) is too low, the added additive (A) is relatively too insufficient to provide enough $N^+$ structure to neutralize the free electrons or negative ions generated by lithium ion deintercalation of the lithium supplement, such that these free electrons or negative ions that can't be neutralized may produce other harmful side reactions, so the effect of improving the utilization efficiency of the lithium supplement is limited; However, when N2/(N1×m×x1) is too high, the electrolyte solution contains too many additives, which may cause easy lithium precipitation on the surface of the negative electrode and deteriorate the direct-current resistance of the battery, thereby reducing the measured utilization efficiency of the lithium supplement.

Examples 5-1-5-5

The secondary battery of examples 5-1-5-5 is prepared in the same steps as that of example 1-3, except that the electrolyte solution with the composition shown in table 5 is used. The ratios shown in the column of electrolyte solution in table 5 are mass ratios.

For the secondary batteries of comparative example 1-1, examples 1-1, 1-3, 1-6, 1-8, 1-9, and 5-1-5-5, the electrical conductivity of the electrolyte solution is tested according to the following methods, respectively, and the utilization efficiency of lithium supplement, specific charge/discharge capacity and capacity retention rate are tested according to the aforementioned methods, and the results are shown in table 5, respectively.

Test method for the electrical conductivity of the electrolyte solution:

Reference standard: HG/T 4067-2015 industry standard for cell liquor of lithium hexafluorophosphate The electrolyte solution sample is poured into a dry and clean plastic centrifuge tube, placed in a constant temperature bath at 25° C. and kept at constant temperature for 30 min. A platinum black electrode (DJS-1C type) is cleaned with pure water, and the moisture is absorbed. The electrode in which the moisture has been absorbed is placed into the uniform sample to be tested vertically, a conductivity tester (Leici, DDSJ-318) is used to measure the electrical conductivity, the test value is read after it is stable, the test is repeated three times, and the average value is recorded.

TABLE 5

| | Lithium supplement | Additive (A) | Additive (A): lithium supplement N2/(N1 × m × x1) | Electrolyte | Adding method | Electrical conductivity of electrolyte solution (S/m) | Utilization efficiency of lithium supplement | Specific charge capacity (mAh/g) | Specific discharge capacity (mAh/g) | Capacity retention rate after storage at 60° C. for 100 days |
|---|---|---|---|---|---|---|---|---|---|---|
| Comparative Example 1-1 | $Li_5FeO_4$ | / | — | DMC/EC/EMC = 60:20:20 | / | 10.4 | 72.3% | 164 | 142 | 94.8% |
| Example 1-1 | $Li_5FeO_4$ | N-tert-butyl-α-phenylnitrone | 0.1 | DMC/EC/EMC = 60:20:20 | In electrolyte solution | 10.2 | 83.3% | 166 | 144 | 96.1% |
| Example 1-3 | $Li_5FeO_4$ | N-tert-butyl-α-phenylnitrone | 0.28 | DMC/EC/EMC = 60:20:20 | In electrolyte solution | 10.1 | 91.2% | 169 | 147 | 98.5% |
| Example 1-6 | $Li_5FeO_4$ | N-tert-butyl-α-phenylnitrone | 0.5 | DMC/EC/EMC = 60:20:20 | In electrolyte solution | 10.0 | 82.5% | 165 | 139 | 95.3% |
| Example 1-8 | $Li_5FeO_4$ | N-tert-butyl-α-4-fluorophenyl-nitrone | 0.28 | DMC/EC/EMC = 60:20:20 | In electrolyte solution | 9.7 | 89.6% | 168 | 146 | 97.9% |
| Example 1-9 | $Li_5FeO_4$ | 5,5-dimethyl-1-pyrroline oxide | 0.28 | DMC/EC/EMC = 60:20:20 | In electrolyte solution | 9.5 | 87.7% | 167 | 144 | 96.8% |
| Example 5-1 | $Li_5FeO_4$ | N-tert-butyl-α-phenylnitrone | 0.28 | DMC/EC/EMC = 20:20:60 | In electrolyte solution | 8.6 | 87.80% | 162 | 143 | 96.20% |
| Example 5-2 | $Li_5FeO_4$ | N-tert-butyl-α-phenylnitrone | 0.28 | DMC/EC/EMC = 40:20:40 | In electrolyte solution | 9.3 | 88.70% | 163 | 143 | 96.90% |
| Example 5-3 | $Li_5FeO_4$ | N-tert-butyl-α-phenylnitrone | 0.28 | DMC/EC/EMC = 70:20:10 | In electrolyte solution | 11.4 | 91.00% | 169 | 147 | 97.20% |
| Example 5-4 | $Li_5FeO_4$ | N-tert-butyl-α-phenylnitrone | 0.28 | DMC/EC = 80:20 | In electrolyte solution | 12.3 | 89.80% | 169 | 146 | 95.90% |
| Example 5-5 | $Li_5FeO_4$ | N-tert-butyl-α-phenylnitrone | 0.28 | EMC/EC = 80:20 | In electrolyte solution | 8.0 | 84.60% | 161 | 142 | 95.40% |

From the results in table 5, it can be seen that after adding the additive (A) to the electrolyte solution, the electrical conductivity of the electrolyte solution is relatively decreased. In addition, since the additive (A) will also increase the interface resistance between the positive and negative electrodes and the electrolyte solution, the addition of the additive (A) will relatively deteriorate the direct current resistance of the secondary battery, thus negatively affecting the performance of the secondary battery. However, as can be seen from the comparison of examples 5-1-5-5 with examples 1-1 and 5-5, by adjusting the proportion of the content of dimethyl carbonate (DMC) in the electrolyte solution, the electrical conductivity of the electrolyte solution can be improved, and the effect of the additive on improving the utilization efficiency of the lithium supplement, as well as the charge/discharge capacity and capacity retention rate of the secondary battery can be further improved. The higher the DMC content in the electrolyte solution, the higher the electrical conductivity of the electrolyte solution, and the easier it is to reduce the direct current resistance of the battery. However, because DMC is easy to crystallize at low temperature and has a low boiling point, if the DMC content is too high, the low-temperature performance of the electrolyte solution will be poor, which will deteriorate the low-temperature direct current resistance, high-temperature storage and high-temperature gas production, so in some embodiments the proportion of the content of dimethyl carbonate (DMC) in the electrolyte solution is adjusted to 20-80 mass %, especially 60-70 mass %.

It should be noted that the present application is not limited to the above embodiments. The above embodiments are exemplary only, and any embodiment that has substantially same constitutions as the technical ideas and has the same effects within the scope of the technical solution of the present application falls within the technical scope of the present application. In addition, without departing from the gist of the present application, various modifications that can be conceived by those skilled in the art to the embodiments, and other modes constructed by combining some of the constituent elements of the embodiments also fall within the scope of the present application.

What is claimed is:

1. A secondary battery, comprising
a positive electrode plate and an electrolyte solution; wherein:
the positive electrode plate comprises a positive current collector and a positive electrode film provided on at least one surface of the positive current collector, wherein the positive electrode film comprises a positive electrode active material and a lithium supplement, and the lithium supplement includes at least one of substances represented by formula (I) below,

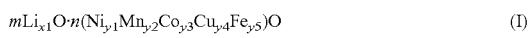

$$mLi_{x1}O \cdot n(Ni_{y1}Mn_{y2}Co_{y3}Cu_{y4}Fe_{y5})O \quad (I)$$

where:
$1 \leq x1 \leq 2$;
$0 \leq y1 \leq 1$; $0 \leq y2 \leq 1$; $0 \leq y3 \leq 1$; $0 \leq y4 \leq 2$; $0 \leq y5 \leq 1$;
$0.5 \leq y1+y2+y3+y4+y5 \leq 1$; and
$1 \leq m \leq 3$; $0 \leq n/m \leq 1$;

the positive electrode film and/or the electrolyte solution includes one or more nitrone derivatives as an additive, a molecule of each of the one or more nitrone derivatives comprising a structure represented by formula (II) below:

and
    a molar content N1 of the lithium supplement and a molar content N2 of the additive satisfy: $0.1 \leq N2/(N1 \times m \times x1) \leq 0.5$.

2. The secondary battery according to claim 1, wherein the lithium supplement comprises at least one of $Li_2O$, $Li_2O_2$, $Li_2FeO_4$, or $Li_2Cu_{0.5}Ni_{0.5}O_2$.

3. The secondary battery according to claim 1, wherein: each of the one or more nitrone derivatives comprises a compound represented by formula (II') below, and/or cyclic nitrone derivatives with 4-8 membered rings,

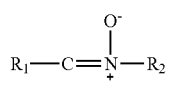 (II')

in formula (II'), $R_1$ and $R_2$ are each independently at least one selected from methyl, ethyl, propyl, isopropyl, butyl, isobutyl, tert-butyl, fluoromethyl, fluoroethyl, fluoropropyl, methylhydroxy, ethylhydroxy, phenyl, tolyl, fluorophenyl, methoxy, ethoxy, 1,1-dimethyl-ethanol group, 1,1-dimethyl-propanol group, 1,1-dimethyl-butanol group, 1-methyl-propanol group, and tert-butyl triol group.

4. The secondary battery according to claim 1, wherein the additive comprises at least one of N-tert-butyl-α-phenylnitrone, N-tert-butyl-α-4-fluorophenylnitrone, or 5,5-dimethyl-1-pyrroline oxide.

5. The secondary battery according to claim 1, wherein a volume average particle size Dv50 of the lithium supplement is greater than a volume average particle size Dv50 of the positive electrode active material.

6. The secondary battery according to claim 1, wherein a volume average particle size Dv50 of the lithium supplement is 5 μm-15 μm.

7. The secondary battery according to claim 1, wherein a specific surface area of the lithium supplement is in a range of $0.5\ m^2/g$-$20\ m^2/g$.

8. The secondary battery according to claim 1, wherein a purity of the lithium supplement is greater than or equal to 90%.

9. The secondary battery according to claim 1, wherein a first delithiation capacity of the lithium supplement is in a range of 300-1500 mAh/g.

10. The secondary battery according to claim 1, wherein a first charge/discharge voltage range of the lithium supplement is 2.0 V-4.5 V.

11. The secondary battery according to claim 1, wherein the electrolyte solution further comprises dimethyl carbonate.

12. The secondary battery according to claim 11, wherein a content of the dimethyl carbonate in the electrolyte solution is 20 mass %-80 mass %.

13. The secondary battery according to claim 11, wherein a content of the dimethyl carbonate in the electrolyte solution is 60 mass %-70 mass %.

14. The secondary battery according to claim 1, wherein the positive electrode active material comprises a lithium-containing phosphate.

15. A power consuming device comprising the secondary battery according to claim 1.

16. A secondary battery, comprising
a positive electrode plate and an electrolyte solution;
wherein:
    the positive electrode plate comprises a positive current collector and a positive electrode film provided on at least one surface of the positive current collector, wherein the positive electrode film comprises a positive electrode active material and a lithium supplement, and the lithium supplement includes at least one of substances represented by formula (I) below,

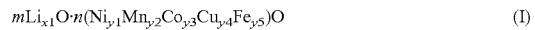 (I)

where:
    $1 \leq x1 \leq 2$;
    $0 \leq y1 \leq 1$; $0 \leq y2 \leq 1$; $0 \leq y3 \leq 1$; $0 \leq y4 \leq 2$; $0 \leq y5 \leq 1$;
    $0.5 \leq y1+y2+y3+y4+y5 \leq 1$; and
    $1 \leq m \leq 3$; $0 \leq n/m \leq 1$;
the positive electrode film includes one or more nitrone derivatives as an additive, a molecule of each of the one or more nitrone derivatives comprising a structure represented by formula (II) below:

 (II)

17. A secondary battery, comprising
a positive electrode plate and an electrolyte solution;
wherein:
    the positive electrode plate comprises a positive current collector and a positive electrode film provided on at least one surface of the positive current collector, wherein the positive electrode film comprises a positive electrode active material and a lithium supplement, and the lithium supplement includes at least one of substances represented by formula (I) below,

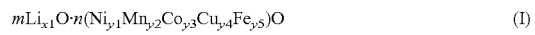 (I)

where:
    $1 \leq x1 \leq 2$;
    $0 \leq y1 \leq 1$; $0 \leq y2 \leq 1$; $0 \leq y3 \leq 1$; $0 \leq y4 \leq 2$; $0 \leq 5 \leq 1$;
    $0.5 \leq y1+y2+y3+y4+y5 \leq 1$; and
    $1 \leq m \leq 3$; $0 \leq n/m \leq 1$;
the positive electrode film and/or the electrolyte solution includes one or more nitrone derivatives as an additive, a molecule of each of the one or more nitrone derivatives comprising a structure represented by formula (II) below:

 (II)

and
    the lithium supplement is coated with a coating layer, the coating layer including at least one of $AlF_3$, $Li_3PO_4$, $Li_2MnO_3$, $LiAlO_2$, $Li_2TiO_3$, $Li_2ZrO_3$, polyethylene glycol-modified poly-3,4-ethylenedioxythiophene (PEDOT), or conductive polymer polypyrrole (PPy).

* * * * *